United States Patent [19]
Sidman

[11] Patent Number: 5,317,441
[45] Date of Patent: May 31, 1994

[54] TRANSCEIVER FOR FULL DUPLEX SIGNALLING ON A FIBER OPTIC CABLE

[75] Inventor: Steven B. Sidman, Vancouver, Wash.

[73] Assignee: Advanced Micro Devices, Inc., Sunnyvale, Calif.

[21] Appl. No.: 779,829

[22] Filed: Oct. 21, 1991

[51] Int. Cl.$^5$ .................... H04B 10/24; H04B 10/00
[52] U.S. Cl. ........................... 319/113; 359/140; 359/152; 359/153; 359/161; 372/38
[58] Field of Search ............. 359/113, 114, 152, 127, 359/140, 143, 153, 161, 173, 179; 372/38; 370/24, 29; 375/7

[56] References Cited

U.S. PATENT DOCUMENTS

| | | | |
|---|---|---|---|
| 4,698,800 | 10/1987 | Cavaliere et al. | 375/7 |
| 5,027,434 | 6/1991 | Brahms et al. | 359/113 |
| 5,111,451 | 5/1992 | Piasecki et al. | 370/29 |

FOREIGN PATENT DOCUMENTS

| | | | |
|---|---|---|---|
| 0028538 | 3/1981 | Japan | 359/114 |
| 0061844 | 5/1981 | Japan | 359/113 |
| 0175539 | 7/1988 | Japan | 359/113 |
| 1429875 | 6/1972 | United Kingdom | 359/114 |
| 2014723 | 8/1979 | United Kingdom | 359/113 |

Primary Examiner—Richard E. Chilcot, Jr.
Assistant Examiner—K. Negash
Attorney, Agent, or Firm—Fliesler, Dubb, Meyer & Lovejoy

[57] ABSTRACT

A full duplex optical signal transmission system comprising a pair of transceivers interconnected by means of a single fiber optic cable is provided with an optical receiver for detecting transmitted and received optical signals and a delay and compensation circuit used in conjunction with a differential amplifier coupled to the optical signal receiver for separating the transmitted optical signal from the received optical signal for providing an output from the transceiver comprising a signal corresponding to the received optical signal.

14 Claims, 2 Drawing Sheets

TRANSCEIVER FOR FULL DUPLEX SIGNALLING ON A FIBER OPTIC CABLE

BACKGROUND OF THE INVENTION

1. Field of the Invention

The present invention relates to fiber optic transmission systems in general and in particular to a transceiver for providing full duplex signalling in an optical transmission system comprising a single fiber optic cable.

2. Description of the Prior Art

A full duplex communication transmission system in general comprises one or more transmission line(s) having both a receiver and a transmitter, i.e. transceiver, located at each end of the line(s) for simultaneously receiving and transmitting signals. Whatever the nature of the signals being transmitted and received by each of the transceivers, when a single transmission line is used some method or means must be provided for separating the signals, i.e. for distinguishing the transmitted signals from the received signals.

In known systems for transmitting and receiving electrical signals on a single coaxial cable, also known as an electrical hybrid, full duplex operation is achieved using differential amplifiers at each end of the cable. In a system of this type, for example, one half of the transmitted power is applied by means of a pair of voltage dividers to each input of the differential amplifier at each end of the cable and to one end of the cable. Since the same signal, i.e. the transmitted signal, is applied to both inputs of the differential amplifier, there is no output resulting therefrom. However, a signal received from the cable being applied to only one of the amplifier inputs will unbalance the amplifier and produce a corresponding signal on the output thereof. Thus, simultaneously transmitted and received signals are separated.

In optical transmission systems, previous proposals for achieving full duplex communication over a single fiber optic cable have involved suggestions for using different color optical sources in a frequency division multiplex scheme or using different polarizations of light (horizontal and vertical) to effectively separate each end of the duplex. The use of differential amplifiers or other types of comparators and associated circuits for providing full duplex operation in an optical transmission system does not appear to have been disclosed or suggested.

SUMMARY OF THE INVENTION

In view of the foregoing, principal objects of the present invention are a method and apparatus for providing full duplex signal transmissions over a single fiber optic cable.

In accordance with the above objects there is provided a transceiver comprising means for separating a transmitted signal from a received signal at both ends of the fiber optic cable.

In one embodiment of the present invention the separating means comprises a laser transmitter having or used with a back-facet sensing diode. The output from the back-facet sensing diode is applied to one input of a differential amplifier and compared with the electrical signal used to drive the laser transmitter. Delay and amplitude compensating means is provided to equalize the output of the back-facet sensing diode and the electrical signal used to drive the laser transmitter so as to null the output of the differential amplifier. However, an optical output from the fiber optic cable which is received from a distant transmitter and sensed by the back-facet sensing diode is not nulled out locally, and so appears on the output of the differential amplifier as a received signal.

In another embodiment of the present invention, a beam splitter and a light sensing diode or the like is used at each end of the cable in place of the back-facet sensing diode for transducing a portion of the transmitted optical signal for application to one input of a differential amplifier or other comparator.

In each of the above embodiments, the transmitted signals may be either digital or analog. The only significant signal limitation being that the total optical signal, i.e. the sum of the transmitted and received signals, must be within the dynamic range of the receiving electronics. Accordingly, the maximum transmitted power in a full duplex signal fiber optic system is limited to about one half of the power that can be transmitted in a half-duplex system using the same electronics.

BRIEF DESCRIPTION OF THE DRAWINGS

The above and other objects, features and advantages of the present invention will become apparent from the following detailed description of the accompanying drawings, in which.

DETAILED DESCRIPTION OF THE DRAWINGS

Figure 1:
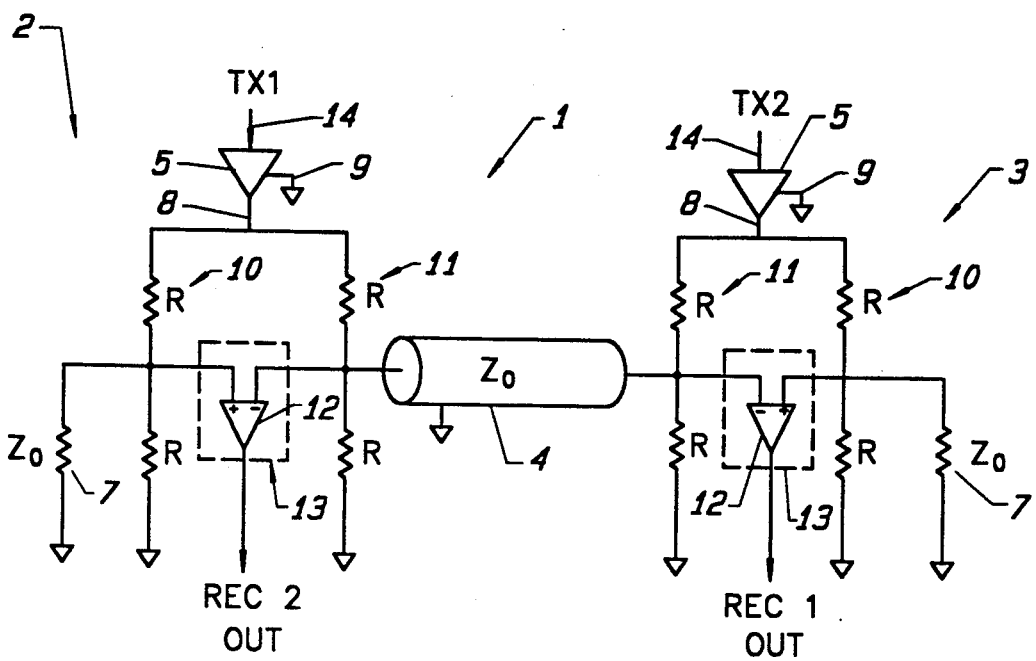
FIG. 1 is a schematic diagram of a prior art electrical, hybrid full duplex signalling system.

Referring to FIG. 1, there is shown a standard electrical hybrid duplex signal communication system designated generally as 1, comprising a local transceiver 2 and a substantially identical remote transceiver 3 which are interconnected by means of a coaxial cable 4 having a line impedance $Z_0$. The terms local and remote are used simply to indicate that the remote transceiver 3 is located at a distance from the local transceiver 2. In each of the transceivers 2 and 3 there is provided a driver 5 and a termination 7. The driver 5 has a single-ended output line 8 (a single line which is referenced to a local ground 9) for providing an output which is applied equally via two-resistor voltage divider networks 10 and 11 to the true and complementary or inverting inputs of a differential amplifier 12 which is the front end of a receiver 13. The resistor voltage divider networks 10 and 11 each comprise a pair of resistors R. The termination 7 comprises a resistance $Z_0$ corresponding to the impedance $Z_0$ of the coaxial cable 4 so as to balance the networks 10 and 11.

Since the signal from the driver 5 is applied as a common mode voltage to the differential amplifier 12 of the receiver 13, the voltage difference which the differential amplifier 12 sees is zero and the receiver 12 does not respond to the output of the local driver 5.

In operation, an electrical signal applied to the driver 5 by means of an input line 14 is amplified by the local driver 5 and is propagated down the coaxial cable 4 to the remote transceiver 3. In the transceiver 3 the signal received from the transceiver 2 unbalances the voltages developed across voltage divider networks 10 and 11 located therein and produces a differential input in the differential amplifier 12 in the transceiver 3. The output from the amplifier 12 in the transceiver 3 comprises a faithful reproduction of the signal from the driver 5 in the transceiver 2. Similarly, a signal originating from the driver 5 in the transceiver 3 unbalances the voltages across the voltage drivers 10 and 11 in the transceiver 2, developing a differential signal at the input of the amplifier 12 which is faithfully reproduced at the output of the amplifier 12. Thus simultaneously sending and receiving signals over a single conductor (plus return) is achieved by actively cancelling out the effect of the driver 5 on their associated receivers 13.

Figure 2:
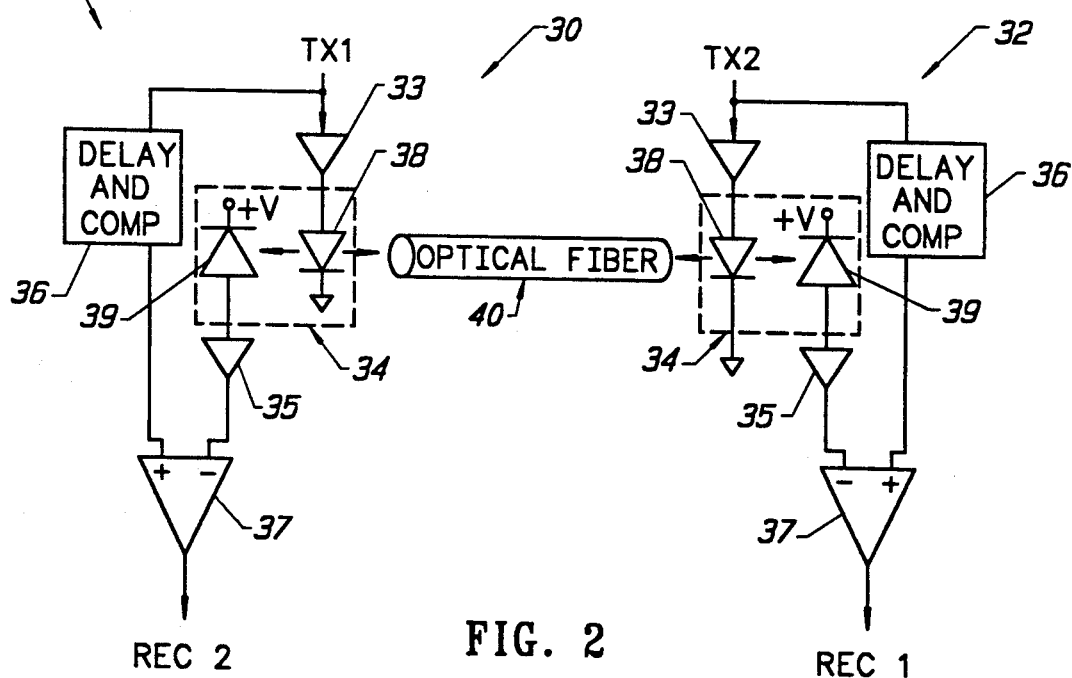
FIG. 2 is a schematic diagram of an embodiment of the present invention.
Figure 3:
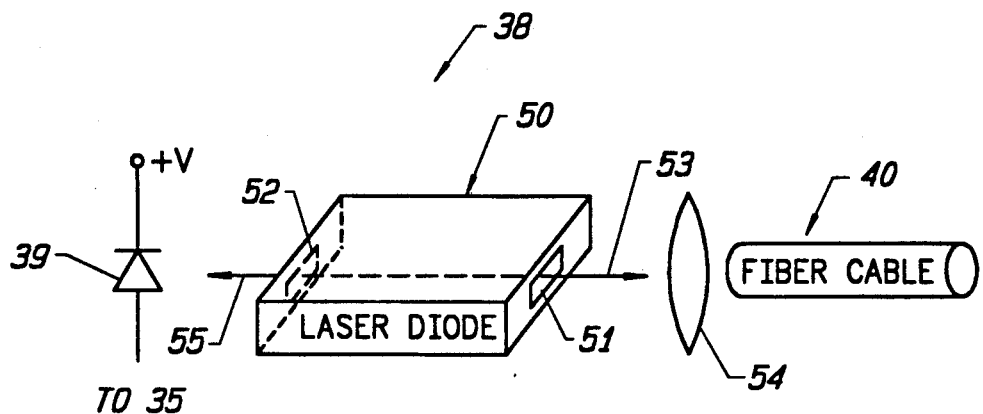
FIG. 3 is a perspective diagrammatic view of a source of current radiation with a back-facet sensing diode is used in the embodiment of FIG. 2.

Referring to FIGS. 2 and 3, there is provided in accordance with one embodiment of the present invention a full duplex optical transmission system designated generally as 30 comprising a local transceiver 31 and a substantially identical remote transceiver 32 which are interconnected by a single fiber optic cable 40. In each of the transceivers 31 and 32 there is provided a driver 33, an optical receiver-transmitter circuit 34, a receiver amplifier 35, a delay and compensation circuit 36, and a differential amplifier 37. In the receiver-transmitter circuit 34 there is provided a source of optical radiation, such as a forward biased transmitting laser diode 38, and an optical signal receiver, such as a reverse bias back-facet sensing diode 39. Typically, this means that the transmitting diode will be driven by a current source whose path is through the diode to ground. Of course, it is also possible to drive the transmitting diode with a current sink whose path is from a supply rail through the diode and then the current sink. The cathode of the receiving diodes 39, which are reverse biased, is typically connected to the supply rail.

Referring to FIG. 3, the source of optical radiation, e.g. laser diode 38, typically comprises a laser diode 50 having a front facet 51 and a rear facet 52. In operation, an electrical signal applied to the input of the driver 33 drives the diode 50. Radiation from the diode 50, as represented by the arrow 53, is then projected through a lens 54 for propagation on the fiber optic cable 40 to the transceiver 32. Optical signals received from the transceiver 32 via the fiber optic cable 40 exit the back facet of the diode 50 as shown by the arrow 55 and are detected by the back-facet sensing diode 39.

The electrical signal which is applied to the input of the driver 33 is also applied to the input of the delay and compensation circuit 36. The output of the delay and compensation circuit 36 drives one input of the differential amplifier 37. The other input of the differential amplifier 37 is driven by an amplified version of the signal developed by the receiver diode 39 which comprises a first component corresponding to the optical output of the source 38 and a second component which corresponds to the optical signal from the fiber optic cable 40 which is transmitted by the remote transceiver 32. By properly adjusting the delay and amplitude compensation circuit 36, the first component corresponding to the optical signal from the optical source 38 is cancelled out so that the output, of the amplifier 37 is limited to the second component corresponding to the optical signal from the fiber optic cable 40 which is coming from the remote transceiver 32. Because identical circuits are used in the transceiver 32, optical signals generated in the transceiver 32 for transmission to the local transceiver 31 are separated from signals received by the transceiver 32 from the transceiver 31 in the same manner, thus providing full duplex operation in an optical system using a single fiber optic cable.

Figure 4:
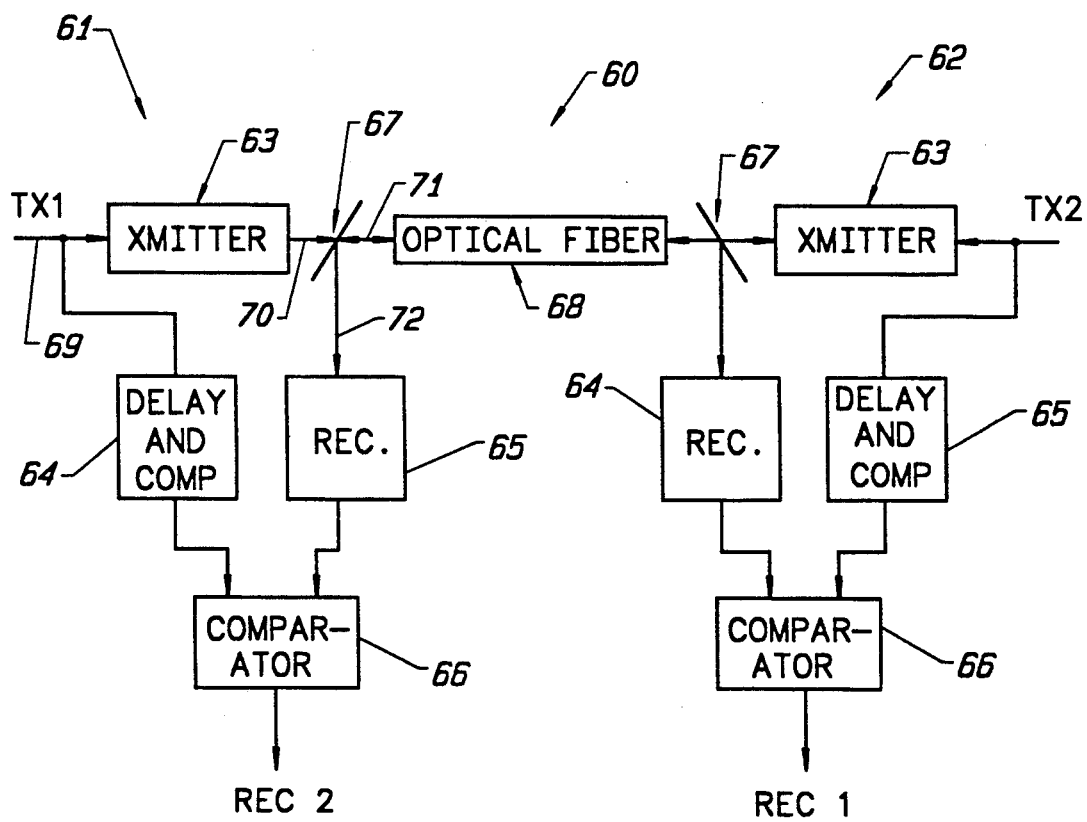
FIG. 4 is another embodiment of the present invention.

Referring to FIG. 4, there is provided in another embodiment of the present invention a full duplex signalling transmission system designated generally as 60. In the system 60 there is provided a local transceiver 61 and a remote transceiver 62. In each of the transceivers 61 and 62 there is provided a source of coherent radiation 63, such as a laser diode, a delay and compensation circuit 64, a receiver 65, a comparator 66 and a beam splitter 67. The optical transceiver 61 and 62 are interconnected by a fiber optic cable 68.

In operation, an electrical signal applied to the input of the transmitter 63 on an input line 69 results in the generation of an optical signal represented by the arrow 70. A portion of the optical signal 70 is directed through the fiber optic cable 68 to the transceiver 62 as shown by the arrow 71 and to the receiver 65 as shown by the arrow 72. The electrical signal applied to the transmitter 63 is also applied to the input of the delay and compensation circuit 64.

Assuming that both transceivers 61 and 62 are transmitting optical signals at the same time, the output of the receiver 65 due to radiation directed thereto by the beam splitter 67 comprises a first component corresponding to the optical signal transmitted to the transceiver 62 and a second component corresponding to the optical signal received from the fiber optic cable 68. The delay and compensation circuit 64 provides an output which corresponds to the magnitude and phase of the first component of the output of the receiver 65, namely the optical signal transmitted to the transceiver 62. In the comparator 66 the outputs of the delay and compensation circuit 64 and the receiver 65 are compared as in a differential amplifier described above with respect to FIG. 2. Since the effects of the optical signal transmitted from the transceiver 61 to the transceiver 62 are cancelled by the differential amplifier in the comparator 66. The output of the comparator 66 is a faithful reproduction of the optical signal received from the transceiver 62. The transceiver 62 operates in substantially the same manner as described above with respect to the transceiver 61.

While preferred embodiments of the present invention are described above, it is contemplated that various modifications may be made thereto without departing from the spirit and scope of the present invention. For example, in addition to using the integrated system of a back-facet sensing diode which is built into many laser diodes so that the driver diode, the receiver diode, and the interface to the optical fiber are all in one physical entity, or a beam-splitting arrangement as described above with respect to FIG. 4, it is also possible that edge emitting LED drivers can be modified to have the equivalent of the laser diodes back-facet sensing diode. While the delay and compensation circuits 36 and 64 described above comprise basically a voltage divider possibly buffered by an amplifier and an adjustable delay element such as a tapped delay line, or in the case of digital signals a string of logic gates, other types of delay and compensation circuits may also be used. Moreover, it should be recognized that the principles of the present invention as described above are applicable to both analog as well as digital optical signals and that the invention may be used in conjunction with the above-described prior known full duplex signalling schemes to permit even more channels to share a single fiber.

Accordingly, it is intended that the embodiment described be considered only as an illustration of the present invention and that the scope thereof should not be limited thereto but be determined by reference to the claims hereinafter provided and their equivalents.

What is claimed is:

1. For use in an optical signal transmission system having a local transceiver and a remote transceiver for full duplex signalling between the two transceivers, a transceiver comprising:

means for transmitting in response to an input signal an optical signal corresponding to the input signal over a fiber optic cable to a remote transceiver;

means for receiving simultaneously an optical signal which corresponds to said input signal and an optical signal from a remote transceiver for providing a first output signal having a first component which corresponds to said input signal and a second component which corresponds to the optical signal received from the remote transceiver; and means for providing in response to said input signal and said first output signal having said first and said second components a second output signal comprising said second component with said first component remoted therefrom, said means for providing said second output signal comprising means for generating a signal which is equal in magnitude and opposite in phase to the magnitude and phase of said first component in said first output signal.

2. A transceiver according to claim 1 wherein said transmitting means comprises a source of coherent radiation.

3. A transceiver according to claim 2 wherein said source of coherent radiation comprises a laser diode.

4. A transceiver according to claim 1 wherein said transmitting means comprises a laser diode and said receiving means comprises a back-facet sensing diode.

5. A transceiver according to claim 1 wherein said transmitting means comprises a source of coherent radiation, said receiving means comprises means responsive to said coherent radiation, and said transceiver comprises means located between said source of coherent radiation and the fiber optic cable for reflecting a portion of the optical signal from the source of coherent radiation to said means responsive to said coherent radiation.

6. A transceiver according to claim 5 wherein said reflecting means comprises a beam splitter.

7. A method of full duplex signalling in an optical signal transmission system having a local transceiver and a remote transceiver comprising the steps of:

transmitting in response to an input signal an optical signal corresponding to the input signal over a fiber optic cable to a remote transceiver;

receiving simultaneously an optical signal which corresponds to said input signal and an optical signal from a remote transceiver for providing a first output signal having a first component which corresponds to said input signal and a second component which corresponds to the optical signal received from the remote transceiver; and providing in response to said input signal and said first output signal having said first and said second components a second output signal comprising said second component with said first component removed therefrom, said step of providing said second output signal comprises the step of generating a signal which is equal in magnitude and opposite in phase to the magnitude and phase of said first component in said first output signal.

8. A method according to claim 7 wherein said step of transmitting an optical signal comprises the step of transmitting coherent radiation.

9. A method according to claim 8 wherein said step of transmitting coherent radiation comprises the step of transmitting coherent radiation from a laser diode.

10. A method according to claim 7 wherein said step of transmitting an optical signal comprises the step of transmitting coherent radiation from a laser diode and said step of receiving an optical signal comprises the step of receiving and optical signal using a back-facet sensing diode.

11. A method according to claim 7 wherein said step of transmitting an optical signal comprises the step of transmitting coherent radiation and said step of receiving an optical signal comprises the step of reflecting a portion of the optical signal from the transmitting means to a means responsive to said coherent radiation.

12. A method according to claim 11 wherein said step of reflecting comprises the step of reflecting a portion of the optical signal from the transmitting means to a means responsive to said coherent radiation using a beam splitter.

13. For use in an optical signal transmission system having a local transceiver and a remote transceiver for full duplex signalling between the two transceivers, a transceiver comprising:

means for transmitting in response to an input signal an optical signal corresponding to the input signal over a fiber optic cable to a remote transceiver;

means for receiving simultaneously an optical signal which corresponds to said input signal and an optical signal from a remote transceiver for providing a first output signal having a first component which corresponds to said input signal and a second component which corresponds to the optical signal received from the remote transceiver; and means for providing in response to said input signal and said first output signal having said first and said second components a second output signal comprising said second component with said first component remoted therefrom, said means for providing said second output signal comprising:

means responsive to said input signal for generating a compensating signal which is equal in magnitude and opposite in phase to the magnitude and phase of said first component in said first output signal; and a differential amplifying means responsive to said first output signal and said compensating signal for providing said second output signal.

14. A method of full duplex signalling in an optical signal transmission system having a local transceiver and a remote transceiver comprising the steps of:

transmitting in response to an input signal an optical signal corresponding to the input signal over a fiber optic cable to a remote transceiver;

receiving simultaneously an optical signal which corresponds to said input signal and an optical signal from a remote transceiver for providing a first output signal having a first component which corresponds to said input signal and a second component which corresponds to the optical signal received from the remote transceiver; and providing in response to said input signal and said first output signal having said first and said second components a second output signal comprising said second component with said first component removed therefrom, said step of providing said second output signal comprising the steps of:

generating in response to said input signal a compensating signal which is equal in magnitude and opposite in phase to the magnitude and phase of said first component in said first output signal; and amplifying in a differential amplifying means said first output signal and said compensating signal for providing said second output signal.

* * * * *